United States Patent
Hagiwara

(10) Patent No.: US 7,155,002 B2
(45) Date of Patent: Dec. 26, 2006

(54) CALL-TO-MAKE REMINDER SYSTEM

(76) Inventor: Shu Hagiwara, 4-9-908 Higashi ueno 4-chome, Taito-ku, Tokyo 110-0015 (JP)

( * ) Notice: Subject to any disclaimer, the term of this patent is extended or adjusted under 35 U.S.C. 154(b) by 577 days.

(21) Appl. No.: 10/409,956

(22) Filed: Apr. 9, 2003

(65) Prior Publication Data

US 2003/0215077 A1    Nov. 20, 2003

Related U.S. Application Data

(63) Continuation of application No. PCT/JP01/08795, filed on Oct. 5, 2001.

(30) Foreign Application Priority Data

Oct. 10, 2000 (JP) .............................. 2000-309180

(51) Int. Cl.
*H04M 3/42* (2006.01)
(52) U.S. Cl. ..................... 379/210.01; 379/201.02; 379/904
(58) Field of Classification Search ........... 379/201.02, 379/207.02, 210.01, 354, 904
See application file for complete search history.

(56) References Cited

U.S. PATENT DOCUMENTS

| | | | | | |
|---|---|---|---|---|---|
| 4,782,521 | A | * | 11/1988 | Bartlett et al. ............... | 379/354 |
| 5,165,012 | A | * | 11/1992 | Crandall et al. ............ | 715/809 |
| 5,625,683 | A | * | 4/1997 | Nazanin et al. ........ | 379/355.06 |
| 6,212,268 | B1 | * | 4/2001 | Nielsen .................. | 379/210.01 |
| 6,317,593 | B1 | * | 11/2001 | Vossler .................... | 455/414.1 |
| 6,674,483 | B1 | * | 1/2004 | Takeda et al. .............. | 348/553 |
| 6,940,395 | B1 | * | 9/2005 | Steinmark .............. | 340/309.16 |

* cited by examiner

*Primary Examiner*—Bing Q. Bui
(74) *Attorney, Agent, or Firm*—Greer, Burns & Crain, Ltd.

(57) ABSTRACT

A system to remind a user of calls he should make, to prevent protracted negligence, comprises a telephone service server that generates a call-to-make reminder page based on the urgency of reminder identified by multiplying a non-contact period from the last call made to the person to contact as derived from communication logs by the level of necessity to maintain a close relationship as derived from profiles of the person to contact; and a user's telephone 12*a* equipped with a display unit to show the call-to-make reminder.

5 Claims, 2 Drawing Sheets

CALL-TO-MAKE REMINDER SYSTEM

CROSS REFERENCE

This application is a continuation of co-pending International Application No. PCT/JP01/08795 filed Oct. 5, 2001, which application designates the United States.

TECHNICAL FIELD

This invention relates to a call-to-make reminder system.

BACKGROUND OF THE INVENTION

There already exists personal computers ("PC's"), electronic pocketbooks and the like having the functions of diaries, note pads, plans, schedule management books, address books and telephone books among other things.

These PC's, electronic pocketbooks and the like allow operators to input data such as diaries, notes, plans, schedules, addresses and telephone numbers using a keyboard or a touch pen and record the data as easily as conventional paper media like diaries, note pads, plans, schedule management books, address books, telephone books, etc. They can even store a far greater volume of data than conventional paper media.

PC's, electronic pocketbooks and the like have functions for searching stored data using a recording date, a type of recorded data, a name or the like as a retrieval key, and can even search necessary data immediately from a massive body of data stored. There are also PC's, electronic pocketbooks and the like designed to call attention to the user based on a built-in clock upon reaching a preset date or time for a business appointment or other matter.

As such, the above-cited PC's, electronic pocketbooks and the like are very useful devices for business persons to have for both their work and private lives to run smoothly.

However, despite the current situation where telephones play an important role as a means of communication in both business and private lives, conventional PC's and electronic pocketbooks and the like are still far from satisfactory in terms of call-to-make reminder functions.

It is often the case that frequent telephonic communications are necessary in order to maintain a close relationship with customers, etc. in business life and with friends, in private life. Even in those circumstances, however, people tend to forget about such calls to make. How often to make calls for the said purpose, depends on various factors like the relative position of the person to contact, relationship with him and geographical distance from him and therefore cannot be defined indiscriminately.

For example, frequent calls for no significant purpose from a person of lower position to a person of higher position in a company or the like, is rather detrimental to a close relationship. Between engaged couples, however, a close relationship may be difficult to maintain without making calls to each other more often than usual. With a person living in a remote place requiring higher expenses to communicate with, it is rather easier to maintain a close relationship with fewer calls.

The above-cited conventional PC's, electronic pocketbooks and the like have reminder functions that can be used to remind the user to make a call at the preset date and time as described above, to transact business, apply for formalities, make inquiries or for other purposes. However, they are unable to take account of the above-mentioned various factors before giving a reminder of a specific call to make to maintain a close relationship.

DISCLOSURE OF THE INVENTION

The purpose of this invention is to solve the above-described problems and provide a call-to-make reminder system designed to remind the user of calls he should make, by taking account of such various factors as the relative position of the person to contact, relationship with him and geographical distance from him, in order to prevent the user's protracted negligence under the circumstances where somewhat frequent telephonic communications are necessary in order to maintain a close relationship.

The call-to-make reminder system of this invention comprises a telephone service server connected directly or indirectly to a network and equipped with a memory to store the user's communication logs and pre-registered profiles of persons to contact and an operating device to generate a call-to-make reminder page based on the urgency of reminder identified by multiplying a non-contact period from the last call made to the person to contact, derived from the above-mentioned communication logs by the level of necessity to maintain a close relationship, derived from the above-mentioned profile of the person to contact; and a user's telephone connected directly or indirectly to the network and equipped with a display unit to show the reminder page.

BRIEF DESCRIPTIONS OF DRAWINGS

MOST PREFERRED EMBODIMENTS OF THE INVENTION

Embodiments of this invention are explained below by making reference to the drawings.

Figure 1:
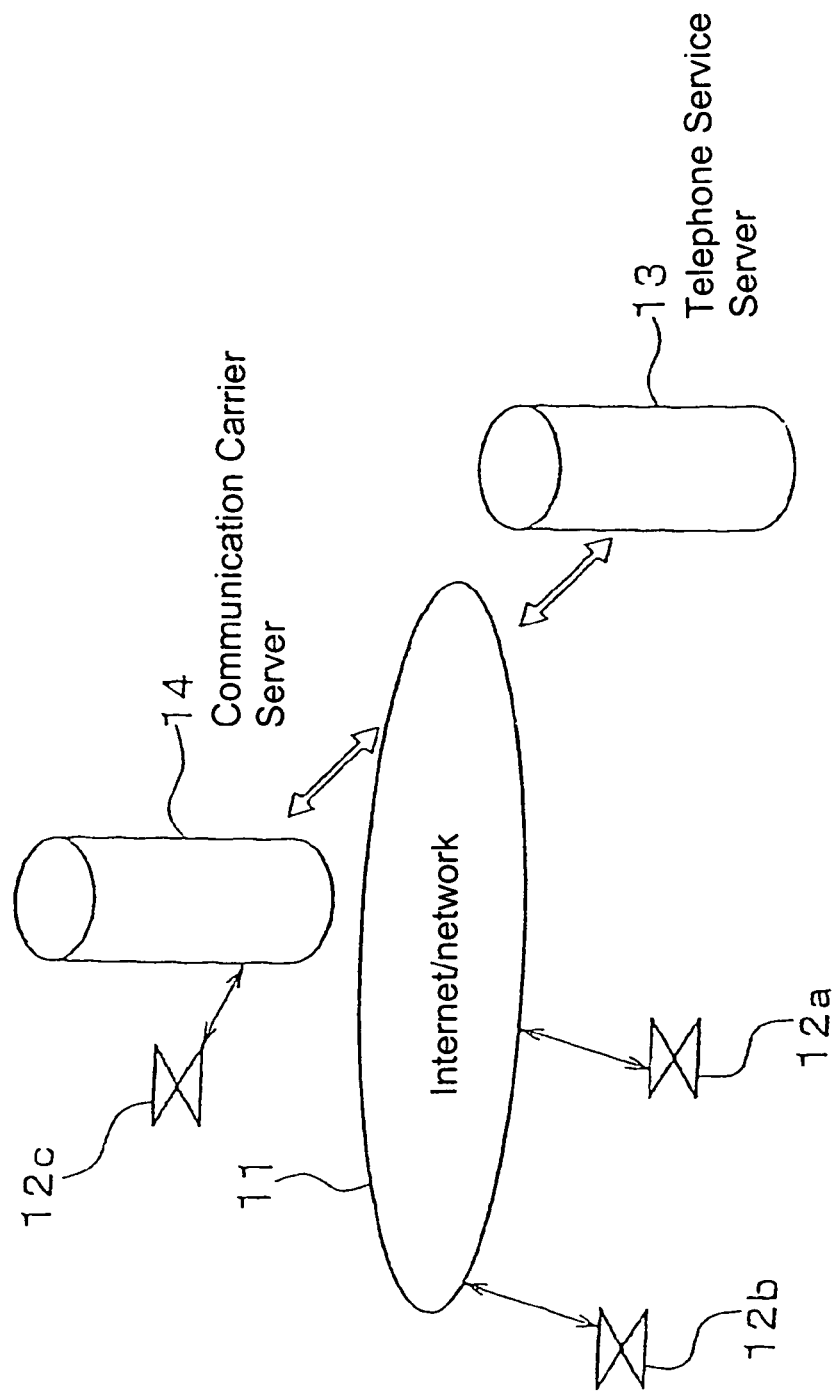
FIG. 1 is a conceptual drawing of call-to-make reminder system as an embodiment of this invention.

FIG. 1 is a conceptual drawing of a call-to-make reminder system as one embodiment of this invention.

In this figure, 11 indicates a network such as Internet, LAN (local area network) WAN (wide area network), a telephone line network or a communication line network. 13 denotes a telephone service server connected to the network 11 through a public communication line or a private line to provide such services as voice mail, telephone call transfers, absence notices or call-to-make reminders. It is preferable that this server be available on a service-by-service basis. This telephone service server 13 incorporates an operating device, a memory, communication interfaces and other functions although not illustrated in the drawing. The memory allows files to be set on a user-by-user basis to store user's private information.

In addition to user's private information, user's communication logs and the profiles of persons to contact registered in advance by the user are also stored in the file. The profile of a person to contact, for example, may include name, age, sex, company name, position, occupational category, importance as a business connection, the level of necessity to maintain a close relationship, temperament, hobbies, closeness with the user, etc. if the person is a business connection; or name, age, sex, occupational category, temperament, hobbies, family make-up, kinship with the user, place of the first acquaintance, the level of necessity to maintain a close relationship, birthday, closeness with the user, etc. if the person is a private acquaintance; or name, age, sex, occupational category, temperament, hobbies, income, a history of visits, the level of necessity to maintain a close relationship, purchase patterns, family make-up, closeness with the user, etc. if the person is a customer of a store.

The user's private information and the profiles of persons to contact, can be updated or modified as required by the user. It is also recommended that user's communication logs be automatically updated.

The above-described operating device generates a call-to-make reminder page on the basis of the user's communication logs and the profile of the person to contact, in order to remind the user to make a call. In this process, the urgency of reminder is basically identified by multiplying a non-contact period from the last call made to the said person to contact as derived from communication logs, by the level of necessity to maintain a close relationship as derived from the profile of the person to contact. At this time, it is assumed that the larger the multiplication result, the greater the urgency of reminder, but other parameters can also taken into consideration.

In case, for example, that communication fee per unit time as derived from communication logs is high, adjustment should be made to underestimate the urgency of reminder despite the lower frequency of telephone contacts assuming that less frequent calls may be acceptable in such cases due to geographical remoteness. For a customer found to have just received a salary according to his profile, adjustment should be made to overestimate the urgency of reminder despite the high frequency of such contacts.

Furthermore, for such special events as the birthday of a parent, a fiancé or fiancée or the like living far, the urgency of reminder can be deemed to be considerably high regardless of the result of multiplication between the non-contact period and the level of necessity. In such cases, apart from a regular reminder, a special reminder can also be displayed. On the contrary, for a business connection enjoying a company holiday, for example, the urgency of reminder can be deemed to be considerably low also regardless of the result of multiplication between the non-contact period and the level of necessity.

Estimation by the above-mentioned operating device, follows the equation set in advance as a default based on the parameters pre-set as defaults (initial status). It is desirable to ensure that the parameters and factors in the equation can be reset as required by the user.

It is also preferable that nicknames and their corresponding telephone numbers be stored in advance in the memory and files set on a user-by-user basis. The telephone service server 13 enables conversion between nicknames and their corresponding telephone numbers. In other words, the telephone service server 13 functions like a telephone or an address book. This function of the telephone service server 13 is used, for example, to make a connection to Internet and thus can be compared to the function of domain name server to enable conversion between domain name and IP address.

The nicknames mean ID's assigned by the user to the respective persons to contact. It consists of a short string of five to ten characters including letters, numbers and symbols.

The user is a person who has made a contract in advance with the party who runs a telephone service server 13 to use the telephone service server 13 based on the contract. He is basically an individual but may also be either a multi-membered body like a family, or group, or a business unit like a company or an office.

The private information is basically not open to the public, and therefore no inquiries from other than the user himself, are acceptable. But, if the user is a business or the like, such information can be disclosed at its discretion.

The telephone service server 13 also functions as a portal site leading to the network 11. A call made by the user is connected to the telephone service server 13 automatically or on demand from the user. In the latter case, it is recommended to ensure that the call can be connected to the telephone service server by pressing the selector button installed on the below-described telephone 12a to 12c or by clicking the icon or the like shown on the display unit of the telephone 12a to 12c. The user can make a call either by means of a standard voice telephone or an IP telephone that enables telephonic voice communications through an IP (Internet protocol) network.

The telephone service server 13 is a single server with multiple functions. These multiple functions can also be distributed to independent servers that are called decentralized servers. This prevents the convergence of accesses from users and disperses them to multiple servers so that little jam occurs despite the small capacity of the lines connected to each server.

12a to 12c stand for cell phones, stationary telephones or the like connected directly or indirectly to the said network 11. These telephones 12a to 12c are installed in large numbers although omitted in the drawing.

The telephones 12a to 12c are not necessarily cell phones, stationary telephones or the like but can take the form of pocketbooks, PC's, PDA's, TV phones or any other devices capable of telephonic communications. A user interface for telephone 12a should preferably be equipped directly with a display unit (not shown) such as a liquid crystal display, a CRT or the like to make this service more handy or equipped with a device connectable to a TV set or an other external display unit to enable the use of an external display unit. This service can also employ the method of providing voice messages instead of a display unit. It is also desirable to provide a telephone similar to the above-mentioned telephone 12a or 12b connected to the above-mentioned network 11 through a public wire or wireless communication line that can allow the user to directly make IP telephone calls. However, a telephone similar to the telephone 12c connected directly or indirectly to the said network 11 through a communication carrier server 14 run by a communication carrier is also acceptable.

The communication carrier server 14 is a server run by a communication carrier having a public wire or wireless communication line under its control. While being connected to the network 11, this server is also connected to the public communication line to serve as a portal site for telephone 12c.

Described below is the operation of a call-to-make reminder system of the above-described configuration.

Figure 2:
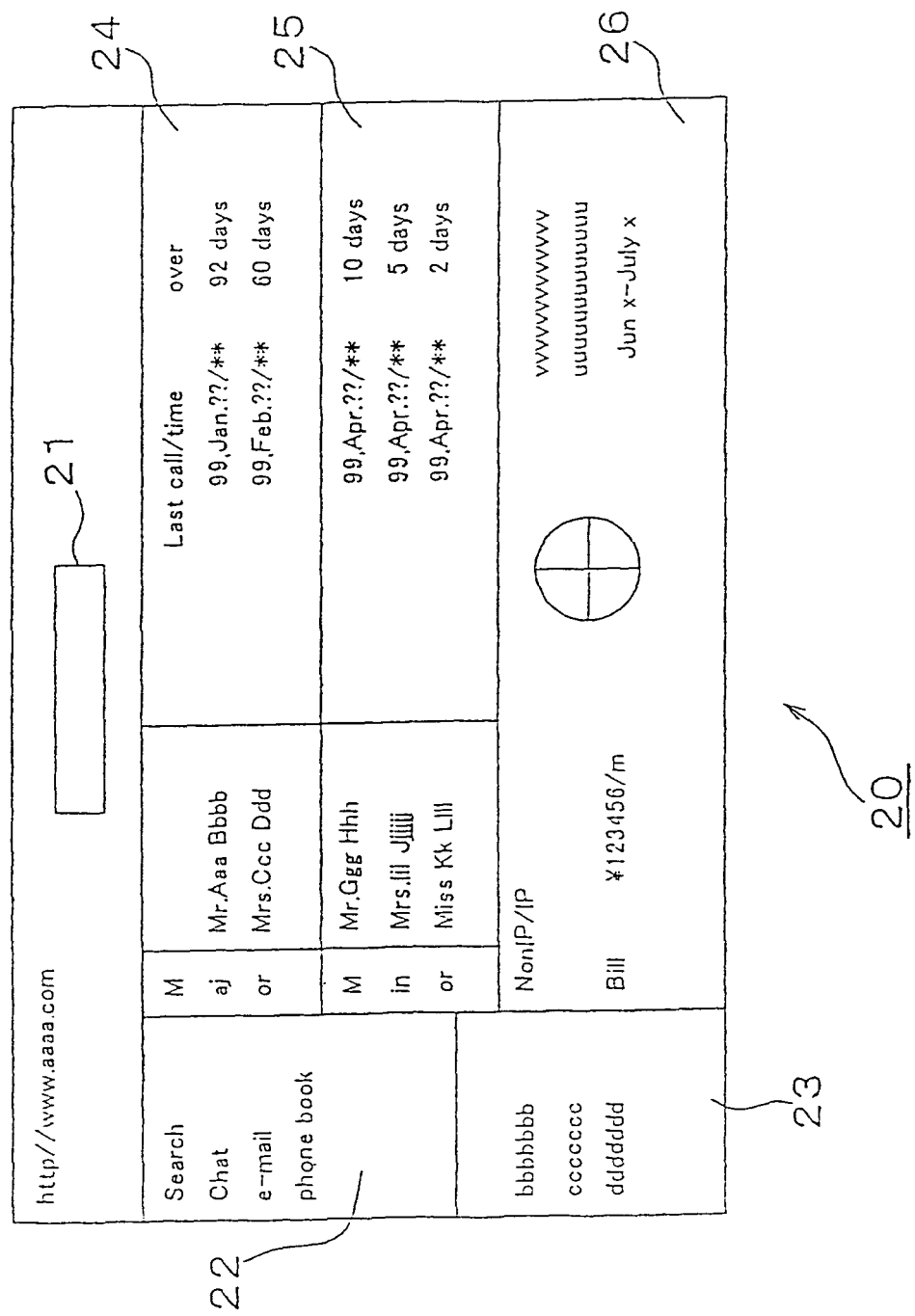
FIG. 2 shows an example of call-to-make reminder page generated by an embodiment of this invention.

FIG. 2 shows an example of call-to-make reminder page created by an embodiment of this invention.

The first step is the operation needed to make an IP telephone call using a telephone 12a (FIG. 1) to a person using a telephone 12b through a telephone service server 13 as a portal site.

From telephone 12a, the user sends the IP address of the telephone service server 13 and the pre-registered nickname of telephone 12b.

Here, the IP address of the telephone service server 13 is 32 bits according to the IPv4 (Internet protocol version 4) currently in use, but it is 128 bits according to the next-generation standard of IPv6 (Internet protocol version 6), which would be too long and cumbersome for the user to input each time he makes a call. It is therefore recommended that the IP address be stored and registered in advance in the memory of the telephone 12a in order for it to be automatically sent. The IP address of the telephone service server 13 is long in itself, but with only a single IP address needs to be registered, the memory of the telephone 12a by no means falls short of capacity.

It is also recommended that the user ID number, pin number and other data of the telephone 12a pre-registered in the telephone service server 13 should also be stored and registered in advance in the memory of the said telephone 12a so that they will be automatically sent.

The nickname normally consisting of a string of about five to ten characters including letters, symbols, numbers or the like, can either be input by the user at each call or stored and registered in advance in the memory of the telephone 12a whose capacity is large enough to accept the registration of the nickname without falling short.

After the telephone 12a is connected to the telephone service server 13 by the transmission of the IP address, the user ID number, pin number and other data of the telephone 12a and the nickname of the said telephone 12b are sent to the telephone service server 13.

Upon receiving the user ID number, pin number and other data of the telephone 12a and the nickname of the telephone 12b, the telephone service server 13 verifies if the user ID number, pin number and other data of the telephone 12a match what is pre-registered.

If their consistency with the registrations is proven, the telephone service server 13 checks if such services as voice mails, telephone call transfers or absence notices have been set for the telephone 12b corresponding to the nickname. With no such services having been set for the telephone 12b, the telephone service server 13 converts the nickname of telephone 12b into its IP address. The telephone service server 13 then connects the telephone 12a to the telephone 12b. This enables the user to make a call using the telephone 12a to the person using the telephone 12b through the network 11.

After completion of a call to the person, if the user accesses the telephone service server 13 and makes a request for a call-to-make reminder page to check for any other persons whom he should call, such a call-to-make reminder page as illustrated in FIG. 2 is shown on the display unit of telephone 12a. The user can access the telephone service server 13 anytime to request the display of a call-to-make reminder page.

20 denotes a call-to-make reminder page to be shown on the display unit of the said telephone 12a. If the screen of the display unit of the telephone 12a is too small to display the page 20 in its entirety, the page 20 can be shown by installments by being scrolled up or down.

21 denotes a frame in which a user ID, a password pin, etc. are entered. 22 denotes an address book column where pre-registered Internet site to which to access routinely or from which to make calls and the names, nicknames or the like of persons to contact are displayed. 23 denotes a private file column where private information of the user himself and pre-registered private information of persons to contact are displayed.

24 and 25 represent reminder display columns to show necessary data to remind the user to call the listed persons to contact. The reminder display column 24 in the upper half shows more urgent reminders, and the reminder display column 25 in the lower half shows less urgent reminders. The names of persons to contact are listed on the left side of the said reminder display columns 24 and 25. Listed on their right side are the dates and times of the last calls made to the respective persons to contact and non-contact period therefrom.

What to display in the reminder display columns 24 and 25 can be modified as required. For example, the indication of a non-contact period can be omitted in exchange for an indication of closeness with the person to contact or the birthday, hobbies or other information of the person to contact.

By viewing the reminder display columns 24 and 25, the user can identify whether or not the listed persons to contact deserve immediate calls and can call them immediately if necessary. The names of persons to contact listed in the reminder display columns 24 and 25 may also be linked to the IP address stored in the memory of the telephone service server 13 so that the user can automatically make IP telephone calls by clicking the respective names of persons to contact.

26 indicates a communication status display column where a telephone fee charged to the user is shown. Display items in this column include the ratio of IP telephone calls to non-IP telephone calls in telephone charges for the previous month, the amount of telephone charges for the previous month and proposals for saving telephone charges.

The layout of the page 20 can be modified in any manner. Frame 21, address book column 22, private file column 23 and communication status display column 26 may be omitted. Also possible is to calculate and display the ratio of IP telephone calls to non-IP telephone calls (cell phones, etc.) in telephone charges to encourage the user to use less expensive (IP) telephone services. Ads and other messages can also be displayed.

In short, the call-to-make reminder system of the above-described configuration derives a non-contact period from the last call made to a person to contact from communication logs and the level of necessity to keep a close relationship from the profile of the person to contact; multiplies the said non-contact period by the said level of necessity to identify the urgency of reminder by assuming that the larger the result of the above multiplication, the higher the urgency and at the same time by taking other parameters into consideration; generates a call-to-make reminder page to remind the user to make a call; and displays the said call-to-make reminder page on the display unit of the user's telephone 12a. It prevents the user from forgetting protractedly about calls he should make and ensures he keeps telephonic communications with other persons as frequently as reasonably needed for the maintenance of a close relationship.

This invention is not limited to the above-described embodiment but is also open to various modifications consistent with its purposes. Such modifications are not excluded from the scope of this invention.

INDUSTRIAL APPLICABILITY

As detailed above, the call-to-make reminder system of this invention consists of a telephone service server connected directly or indirectly to a network and equipped with a memory to store the user's communication logs and the pre-registered profiles of persons to contact and an operating device to generate a call-to-make reminder page based on the urgency of reminder identified by multiplying a non-contact period from the last call made to the person to contact as derived from the above-mentioned communication logs by the level of necessity to maintain a close relationship as derived from the above-mentioned profile of the person to contact; and a user's telephone connected directly or indirectly to the network and equipped with a display unit to show the call-to-make reminder page.

It prevents the user from forgetting protractedly about calls he should make and ensures he keeps telephonic communications with other persons as frequently as reasonably needed for the maintenance of a close relationship.

The invention claimed is:

1. A call-to-make reminder system comprising:
   (a) a telephone service server connected directly or indirectly to a network and equipped with a memory to store a user's communication logs and pre-registered profiles of persons to contact and an operating device to generate a call-to-make reminder page based on the urgency of reminder computed by multiplying (1) a non-contact period from the last call made to the person to contact as derived from said communication logs by (2) a level of necessity to maintain a close relationship as derived from said profiles of persons to contact; and
   (b) a telephone connected directly or indirectly to said network and equipped with a display unit to show said call-to-make reminder page.

2. A call-to-make reminder system comprising:
   a telephone service server in communication with a network, said telephone service server having a memory for storing communication logs and contact person profiles, and having a means for generating call-to-make reminders computed from data stored in said communication logs and contact person profiles; and
   means for displaying said computed call-to-make reminders in communication with the network.

3. A call-to-make reminder system as in claim 2 wherein said displaying means comprises a telephone.

4. A method for generating call-to-make reminders, comprising;
   providing a telephone service server having a memory and an operating device;
   connecting the telephone service server to a network;
   storing communication logs in the memory;
   storing profiles of persons to contact in the memory;
   connecting a telephone to the network, the telephone having a display;
   computing a call-to-make reminder based on information stored in the communication log and profiles; and
   transmitting the computed call-to-make reminder though the network to the telephone display.

5. A method as in claim 4, wherein the profile comprises a level of necessity to maintain a close relationship for each contact person, and the step of computing comprises determining a non-contact period from the last call made to a selected person and multiplying the non-contact period by the level of necessity to maintain a close relationship for said selected person.

* * * * *